(12) United States Patent
Inujima et al.

(10) Patent No.: US 7,835,341 B2
(45) Date of Patent: Nov. 16, 2010

(54) PACKET COMMUNICATION APPARATUS

(75) Inventors: Yuuki Inujima, Yokohama (JP);
Yoshitaka Sainomoto, Fujisawa (JP);
Ken Watanabe, Kawasaki (JP)

(73) Assignee: Alaxala Networks Corporation, Kanagawa (JP)

( * ) Notice: Subject to any disclaimer, the term of this patent is extended or adjusted under 35 U.S.C. 154(b) by 567 days.

(21) Appl. No.: 11/675,184

(22) Filed: Feb. 15, 2007

(65) Prior Publication Data
US 2008/0056238 A1    Mar. 6, 2008

(30) Foreign Application Priority Data
Sep. 6, 2006    (JP)    ............................. 2006-240938

(51) Int. Cl.
*H04J 3/24*    (2006.01)
(52) U.S. Cl. ...................................... 370/349; 370/389
(58) Field of Classification Search ................ 370/349, 370/338, 328, 389, 310, 310.2, 395.2, 230–235; 455/404.2, 410, 411, 421, 435.1, 440, 457; 707/705, 781–785
See application file for complete search history.

(56) References Cited
U.S. PATENT DOCUMENTS

2002/0031108 A1* 3/2002 Inoue ........................ 370/338
2002/0036991 A1* 3/2002 Inoue ........................ 370/328
2005/0208926 A1* 9/2005 Hamada ..................... 455/410
2005/0267954 A1* 12/2005 Lewis et al. ................. 709/221

FOREIGN PATENT DOCUMENTS

JP    2002-084306    3/2002

OTHER PUBLICATIONS

IEEE 802.1X, From Wikipedia, the free encyclopedia, pp. 1-3, Jul. 22, 2004.

* cited by examiner

*Primary Examiner*—Kent Chang
*Assistant Examiner*—San Htun
(74) *Attorney, Agent, or Firm*—Antonelli, Terry, Stout & Kraus, LLP.

(57) ABSTRACT

A packet communication apparatus sends an authentication request packet received from a user terminal to an authentication server. If a packet received from the authentication server is an authentication packet for the user terminal, an authentication controller executes authentication processing of the authentication packet. If the authentication packet includes connection limit information for the user terminal, a connection limit controller sets the connection limit information to the user terminal. According to the connection limit information, the packet communication apparatus sends the packet received from the user terminal to a quarantine server disposed to quarantine the user terminal.

7 Claims, 11 Drawing Sheets

CODE
1 ACCESS-REQUEST
2 ACCESS-ACCEPT
3 ACCESS-REJECT
4 ACCOUNTING-REQUEST
5 ACCOUNTING-RESPONSE
11 ACCESS-CHALLENGE
12 STATUS-SERVER
13 STATUS-CLIENT
255 RESERVED

IDENTIFIER : ID TO DISCRIMINATE USER TERMINAL REQUEST

LENGTH : MESSAGE LENGTH

AUTHENTICATOR : AUTHENTICATION CODE TO CONCEAL DATA AND TO GUARANTEE DATA INTEGRITY

ATTRIBUTE : ATTRIBUTE

TYPE
1  USER-NAME
2  USER-PASSWARD
5  NAS-PORT
64  TUNNEL-TYPE
81  TUNNEL-PRIVATE-GROUP-ID

200  CONNECTION-LIMIT

FIG. 7

| # | ADDRESS | VLAN | TRANSMISSION PORT |
|---|---|---|---|
| 1 | 00:00:11:11:11:11 | 10 | P0 |
| 2 | 00:00:22:22:22:22 | 10 | P1 |
| 3 | 00:00:33:33:33:33 | 10 | P2 |
| 4 | 00:00:44:44:44:44 | 10 | P3 |
| 5 | 00:00:55:55:55:55 | 10 | P3 |

| 1600 | 1601 | 1602 | 1603 | 1604 | 1605 |
|------|------|------|------|------|------|
| VLAN | MAC ADDRESS | CONNECTION PORT | PORT INFORMATION IN CONNECTION PORT | PORT INFORMATION IN COMMUNICABLE CONNECTION PORT | TRANSMISSION PORT |
| 10 | 00:00:33:33:33:33 | P2 | P2-0 | P*-* | * |
| 10 | 00:00:11:11:11:11 | P0 | P0-0 | P2-0 | P2 |

※ 「*」INDICATES ALL PORT INFORMATION OR ALL TRANSMISSION PORTS.

| 1800 | 1801 | 1802 | 1803 | 1804 |
|---|---|---|---|---|
| VLAN | MAC ADDRESS | CONNECTIBLE LAYER 2 COMMUNICATION RANGE | NON-CONNECTIBLE LAYER 2 COMMUNICATION RANGE | TRANSMISSION PORT |
| 200 | 00:00:33:33:33:33 | * | — | * |
| 100 | 00:00:11:11:11:11 | VLAN200 | VLAN50 | P2 |

※ 「*」 INDICATES ALL LAYER 2 COMMUNICATION RANGE OR ALL TRANSMISSION PORTS

US 7,835,341 B2

PACKET COMMUNICATION APPARATUS

INCORPORATION BY REFERENCE

The present application claims priority from Japanese application JP-2006-24093 filed on Sep. 6, 2006, the content of which is hereby incorporated by reference into this application.

BACKGROUND OF THE INVENTION

The present invention relates to a packet communication apparatus for controlling communication in which user authentication is conducted on a network to control the communication based on a result of the user authentication.

In operation of a packet communication apparatus for which user authentication is conducted on a network, when an authentication request is received from a user terminal, it is required for the packet communication apparatus to issue an inquiry to a user authentication server for user's authentication information.

For the authentication processing, Institute of Electrical And Electronic Engineers (IEEE) has prescribed an authentication standard "IEEE802.1X". According to the standard, when a user terminal connects to a network, user authentication is conducted. The system rejects communication from the terminals which have failed in the authentication and allows communication only for the terminals for which the authentication has been successfully terminated.

Specifically, according to IEEE802.1X, a user terminal is called "supplicant", a packet communication apparatus to conduct authentication is called "authenticator", and Extensible Authentication Protocol over Local Area Network (LAN), namely, EAPOL is used for authentication information between the supplicant and the authenticator. Between the authenticator and a general authentication server, Remote Authentication Dial In User Service (RADIUS) sever, there is employed an EAP over RADIUS protocol to exchange information. If the result of the processing executed by the RADIUS server is "reject", the communication is interrupted for the port coupled with the user terminal of the authenticator. If the result is "accept", the communication is allowed for the port. JP-A-2002-84306 describes a technique to control communication for a user terminal on the basis of an authentication result from a user authentication server.

SUMMARY OF THE INVENTION

However, if the communication control is conducted according to the authentication result only for the port connected to the user terminal, there possibly occurs a disadvantageous situation, for example, as below. In a situation in which the user terminal coupled with a first port of a first network moves and is connected to a second port set to a second network other than the first network, if the user terminal is then authenticated, there may occur a case in which the network environment is changed. That is, the user cannot successively utilize the network environment used before the movement of the user terminal.

There exists a technique in which even the user terminal changes the access point to connect to the network, the network environment is not changed for the terminal. According to the technique, VLAN information (network information) to which the user is to belong is added to the authentication result from the user authentication server and is sent to the packet communication apparatus. In the apparatus, a Media Address Control (MAC) address of the user terminal being used by the user is related to the VLAN from the user authentication server. The VLAN is dynamically assigned to the user in cooperation with the authentication so that the user can use the same network environment even if the user accesses the network from any position or place.

However, according to the technique to dynamically assign the VLAN in cooperation with the authentication, even if the user terminal is authenticated to be coupled with the VLAN to which the user is to belong, there may take place a disadvantageous case in which the user terminal has been infected with a computer virus and hence the VLAN may resultantly infected by the virus.

To cope with the difficulty, there has been recently introduced a virus quarantine system which first quarantines a user terminal infected with a virus or a user terminal in which a patch corresponding to the latest virus definition has not been installed. The system then allows the user terminal to connect to the ordinary network. In this connection, a network coupled with a server to conduct the quarantine is called "quarantine network".

Specifically, by use of a technique to dynamically assign the VLAN in cooperation with the authentication, the user authentication server sends VLAN information for the quarantine network, as the VLAN information resultant from authentication of a user terminal to be quarantined, to the packet communication apparatus to thereby connect the user terminal to the (quarantine) server to quarantine the user terminal. After the quarantine server quarantines the user terminal, the terminal is then again authenticated. When the user authentication server transmits VLAN information for an ordinary network to the packet communication apparatus, the user terminal is allowed to connect to the ordinary network.

However, if the network address set to the user terminal is other than an address of the ordinary network or the quarantine network, it is not possible to conduct communication between the user terminal and the ordinary network or between the user terminal and the quarantine network. Therefore, a fixed IP address cannot be set to the user terminal. In general, it is required that by use of Dynamic Host Configuration Protocol (DHCP) standardized by Internet Engineering Task Force (IETF), a network address for the quarantine network and a network address for the ordinary network are automatically assigned to the user terminal for communication. After the user terminal is quarantined, to change the connection destination of the terminal from the quarantine network to the ordinary network, it is required that the user terminal releases the network address for the quarantine network automatically assigned by the DHCP server. Or, it is required to again initiate the user terminal such that the DHCP server automatically assigns the network address for the ordinary network to the user terminal.

It is therefore an object of the present invention to provide a packet communication apparatus in which when a user terminal changes the network connected thereto, the communication range or zone of the user terminal can be changed over without changing the network address of the user terminal.

To achieve the object, there is provided according to the present invention a configuration in which an authentication request packet sent from the user terminal is sent to an authentication server. If the packet is an authentication packet associated with the user terminal, an authentication control section executes authentication processing to authenticate the authentication packet. As a result of the authentication, if it is determined that the authentication packet includes connection limit information regarding the user terminal, a connection limit control section sets the connection limit information to the user terminal and stores the information in a transfer control information storage. According to the connection limit information set to the user terminal, the packet received from the user is transmitted to a quarantine server disposed to quarantine the user terminal.

BRIEF DESCRIPTION OF THE DRAWINGS

FIG. 7 is a diagram showing an example of data stored in a MAC address information storage 610 of FIG. 6.

DESCRIPTION OF THE EMBODIMENTS

Figure 1:
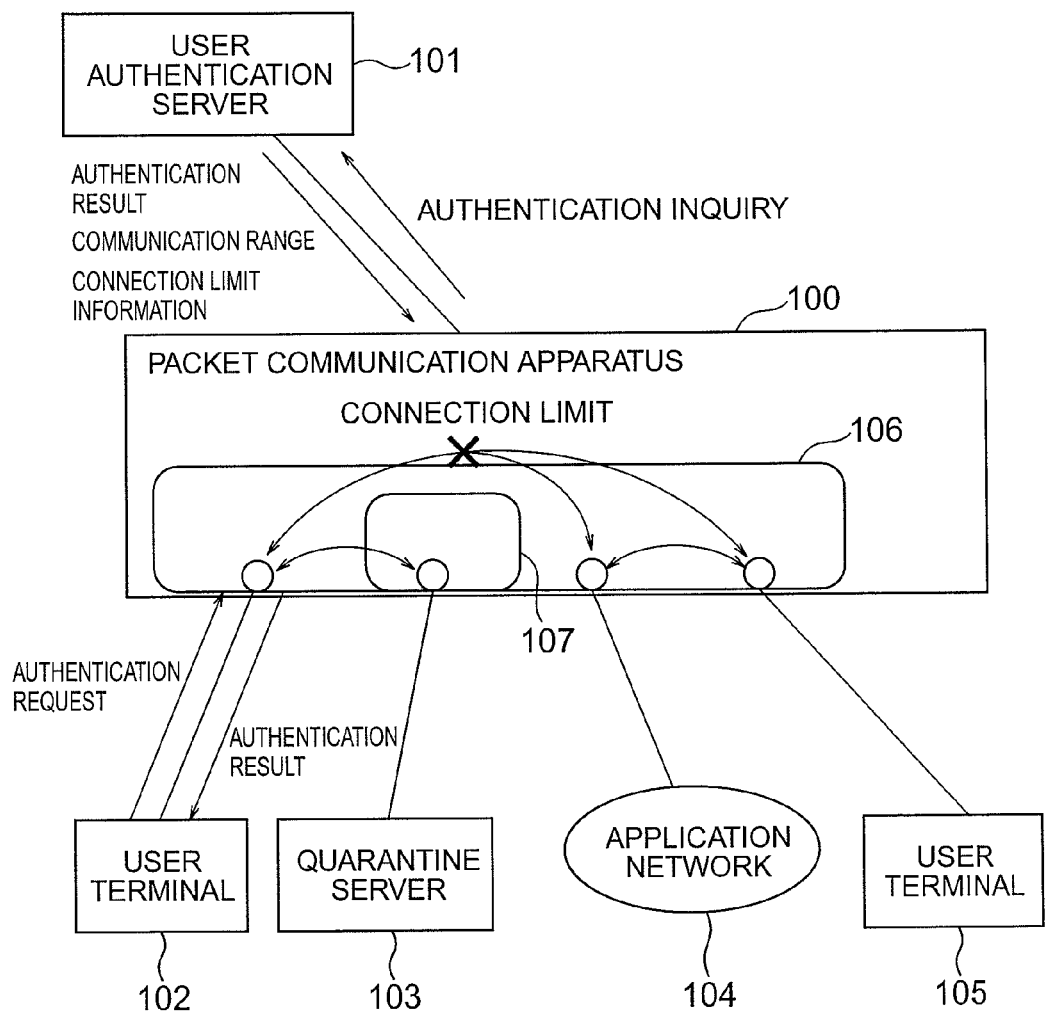
FIG. 1 is a diagram schematically showing a configuration of a first embodiment of a network system according to the present invention.

Referring now to the drawings, description will be given of an embodiment of the present invention. In the description of the embodiment, a virus quarantine system is employed as an example of the network system.

First Embodiment

FIG. 1 shows an example of a configuration of the virus quarantine system. The system includes a packet communication apparatus 100 (e.g., an LAN switch unit), a user authentication server 101, user terminals 102 and 105, a quarantine server 103, and an application network 104. The user authentication server 101 beforehand stores information items registered thereto, for example, user information of the terminals 102 and 105 inputted from the manager, a communication range 106 as a connectible range of the network 104, a communication range 107 of the server 103 to quarantine a user terminal not having been quarantined, and a quarantine state of each user connected to the system.

First, description will be given of authentication processing of the user terminal 105 which has been quarantined and which hence can be connected to the application network 104 only through ordinary authentication. In this case, the user terminal 105 is granted or allowed for connection to the communication range 106, and the user authentication server 101 beforehand stores authentication information of the user registered thereto. For example, the manager registers user's authentication information such as a user identifier (ID) and a password to the user authentication server 101.

To connect to the network 104, the user terminal 105 sends an authentication request to the packet communication apparatus 100. When the request is received, the apparatus 100 extracts therefrom user's authentication information to create an authentication request message and transmits the message to the user authentication server 101. The server 101 searches authentication information and quarantine information beforehand registered for the user terminal 105. If the authentication information thus received matches that searched as above, the authentication is conducted. On the basis of the quarantine information, if it is determined that the terminal 102 has been quarantined, only VLAN information (communication range) connectible for the authenticated user is sent to the packet communication apparatus 100. According to the communication range from the server 101, the apparatus 100 controls to make the MAC address of the user terminal 105 belong to the communication range 106 so that the terminal 105 is connected to the network 104.

However, all user terminals have not been necessarily quarantined. Actually, there exists user terminals not quarantined.

Next, description will be given of a case in which the user terminal 102 has not been quarantined and the authentication is carried out, in response to an authentication request from the terminal 102, using connection limit information allowing only the connection to the server 103 disposed to conduct quarantine. When the user terminal 102 issues an authentication request, the user authentication server 101 makes a search for beforehand registered authentication information by use of the authentication information contained in the message of the authentication request sent via the packet communication apparatus 100. If the authentication information items match each other, the authentication is conducted. Based on the quarantine state of the terminal 102 included in the message, the server 101 determines that the terminal 102 has not been quarantined. The server 101 then sends, to the packet communication apparatus 100, the user connectible communication range 106 and the connection limit information allowing connection only to the quarantine server 103. According to the communication range 106, the apparatus 100 makes the MAC address of the terminal 102 belong the range 106. According to the connection limit information, the apparatus 100 allows connection only to the server 103. As a result of the control operation, the user terminal 102 can be connected only to the server 103.

Figure 2:
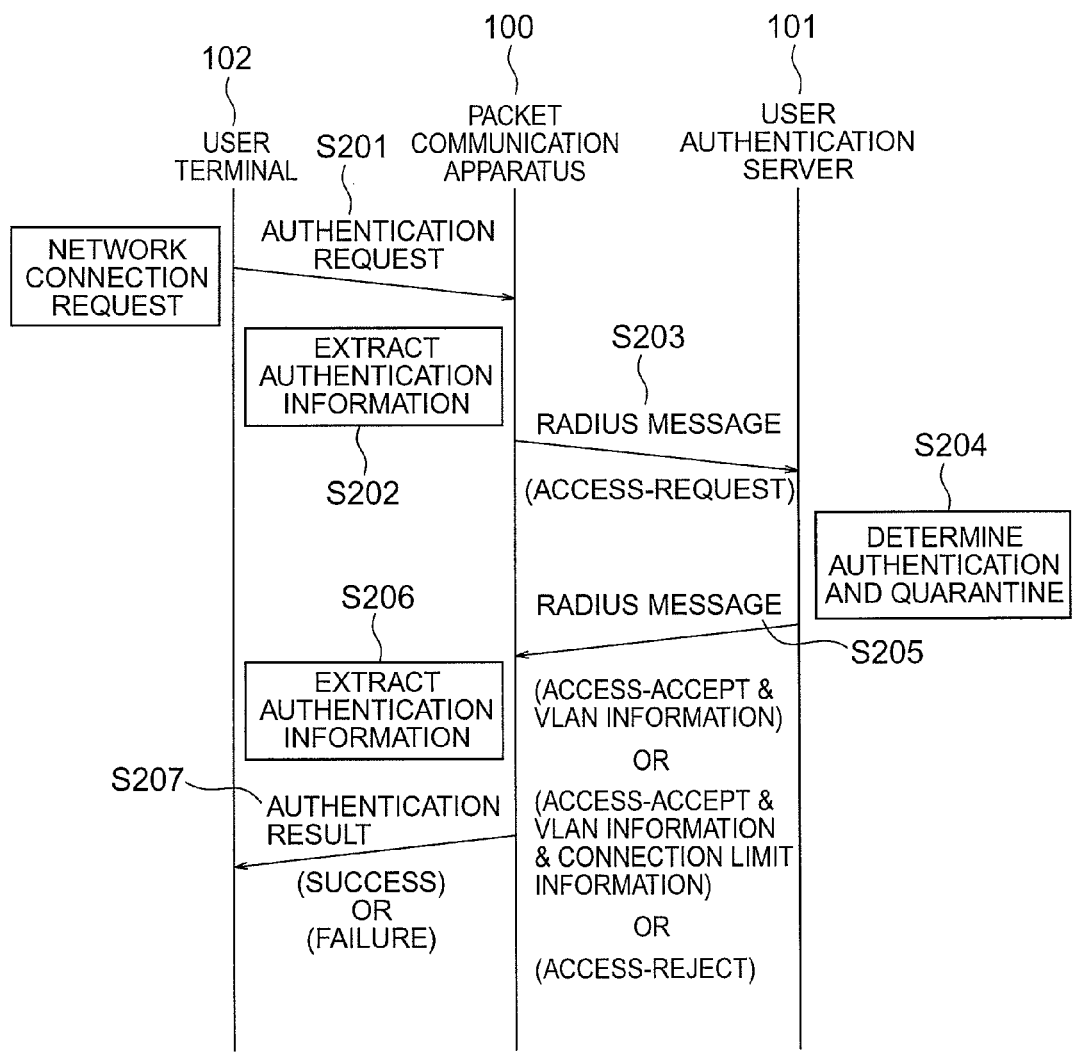
FIG. 2 is a sequence chart showing processing for a network connection request in the system of FIG. 1.

FIG. 2 shows a sequence of the authentication processing executed using the connection limit information. To connect to the network 104, the user terminal 102 sends an authentication request to the packet communication apparatus 100 (step 201). When the request is received, the apparatus 100 extracts therefrom authentication information of the terminal 102 (step 202) and issues an inquiry for the extracted authentication information to the user authentication server 101 (step 203). The inquiry is carried out using, for example, a RADIUS message, which will be described later. For the inquiry, the message includes "access-request" as a code indicating the type of the RADIUS message.

When the query message (RADIUS message) for authentication is received from the packet communication apparatus 100, the user authentication server 101 confirms the user ID and the password on the basis of the registered information to determine whether or not the user is authenticated. Additionally, according to the quarantine information of the terminal 102, the server 101 determines whether or not it is required to connect the terminal 102 to the server 103 (step 204). As a result of the operation, if the user is authenticated but it is required to quarantine the user terminal 102, the user authentication server 101 sends to the packet communication apparatus 100 the authentication result and the connection limit information (which allows the user terminal 102 to connect only to the server 103; step 205). The transmission information also includes the RADIUS message. To accept the authentication, the user authentication server 101 transmits to the packet communication apparatus 100 a message in which the code indicating the type of the RADIUS message is "access-accept". To reject the authentication, the server 101 sends to the apparatus 100 a message in which the code indicating the type of the RADIUS message is "access-reject".

The packet communication apparatus 100 then extracts authentication information from the information (RADIUS message) received from the user authentication server 101 (step 206). If the authentication result is a message of "access-accept" indicating acceptance of the authentication, the apparatus 100 makes the user terminal 102 (corresponding to the authentication request) belong to the VLAN designated by the RADIUS message and sends a message of "success" to the terminal (step 207). If the RADIUS message from the server 101 includes connection limit information, the apparatus 100 controls to connect the terminal 102 only to a connection range designated by the information. If a message including "access-reject" indicating that the authentication is rejected as a result of the authentication is received, the apparatus 100 controls to inhibit connection of the terminal 102 to the network and then transmits a message of "failure" to the user terminal 102 (step 207).

Figure 3:
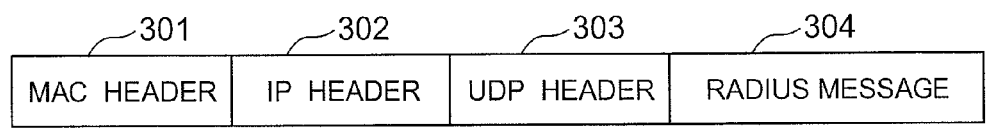
FIG. 3 is a diagram showing an example of a packet format of a RADIUS message communicated between a packet communication apparatus 100 and a user authentication server 101 shown in FIG. 2.

FIG. 3 shows a packet format of the RADIUS message exchanged between the packet communication apparatus 100 and the user authentication server 101. The message includes an MAC header 301 to store a transmission source address and a destination address of layer 2, an IP header 302 to store a transmission source address and a destination address of layer 3, a User Datagram Protocol (UDP) header 303 of layer 4, and a RADIUS message 304 as the message body.

Figure 4:
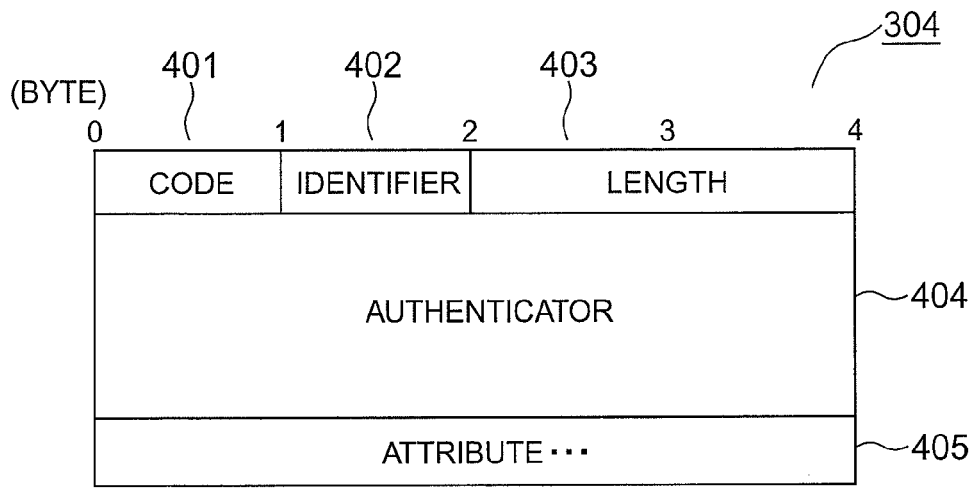
FIG. 4 is a diagram showing an example of a data format of a RADIUS message 304 shown in FIG. 3.

FIG. 4 shows a format of the RADIUS message 304 of FIG. 3. The message 304 includes a code 401 designating a type code of the message, an identifier (ID) 402 to identify a request from the user terminal 102, a length field 403 to indicate the message length, an authenticator field 404 as an authentication code to conceal data and to guarantee data integrity, and an attribute field 405 indicating an attribute value. For example, as can be seen from FIG. 4, a correspondence between the code 401 and the RADIUS message type is defined as "1:Access-Request", "2:Access-Accept", and "Access-Reject".

Figure 5:
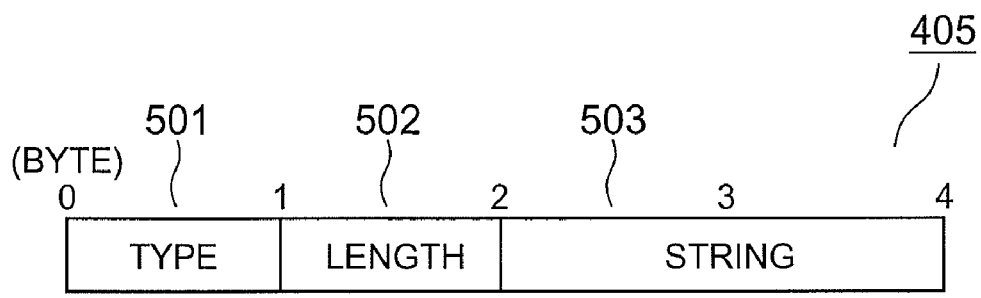
FIG. 5 is a diagram showing an example of a data format of an attribute field 405 shown in FIG. 3.

FIG. 5 shows a format of the attribute 405 in the RADIUS message 304 of FIG. 4. The attribute 405 includes a type field 501 indicating an attribute type, a length field 502 to indicate the attribute length, and a string field 503 indicating information of the attribute.

Description will now be given of the value stored in the type field 501 of the attribute 405 shown in FIG. 5. If the type field 501 contains "1", the type is "user name". In this case, the string field 503 stores, for example, a user name (user ID) of the user operating the user terminal 102. If the type field 501 contains "2", the type is "user password". In this case, the string field 503 stores, for example, a password "CLIENT-1" corresponding to the user ID. If the type field 501 contains "5", the type is NAS-Port1 which is a port number of the packet communication apparatus 100. In this case, the string field 503 stores, for example, a port number of the apparatus 100 coupled with the user terminal 102.

In step 204 (user authentication processing and user terminal quarantine processing) of FIG. 2, if the user authentication server 101 accepts authentication of the user, a RADIUS message 304 (FIG. 3) is sent in step 205 (processing in which the server 101 transmits a RADIUS message to the apparatus 100). In the message 304, the type field 501 (FIG. 5) of the attribute 405 stores "64" indicating "tunnel type" of the user terminal (FIG. 4). In this case, the string field 503 stores, for example, "13" indicating a VLAN. If the type 501 of the attribute 405 contains "81" indicating a tunnel private group ID (VLAN information to make the user terminal belong thereto), the string field 503 stores, for example, "20" indicating VLAN-ID of a VLAN to which the terminal is made to belong.

Also, in step 204 (user authentication processing and user terminal quarantine processing) of FIG. 2, if the user authentication server 101 determines based on the quarantine information of the terminal 102 that it is required to connect the terminal 102 to the server 103 disposed to quarantine the terminal 102, the server 101 designates connection limit information (e.g., "200:Connection limit" of FIG. 5) to the type field 501 of the attribute 405 to thereby store the value of the connection range of the terminal 102. The connection limit information may be designated in combination with various specification items such as the VLAN information. Values other than those shown in FIG. 5 may be defined for the type 501 of the attribute 405 for the connection limit.

Figure 6:
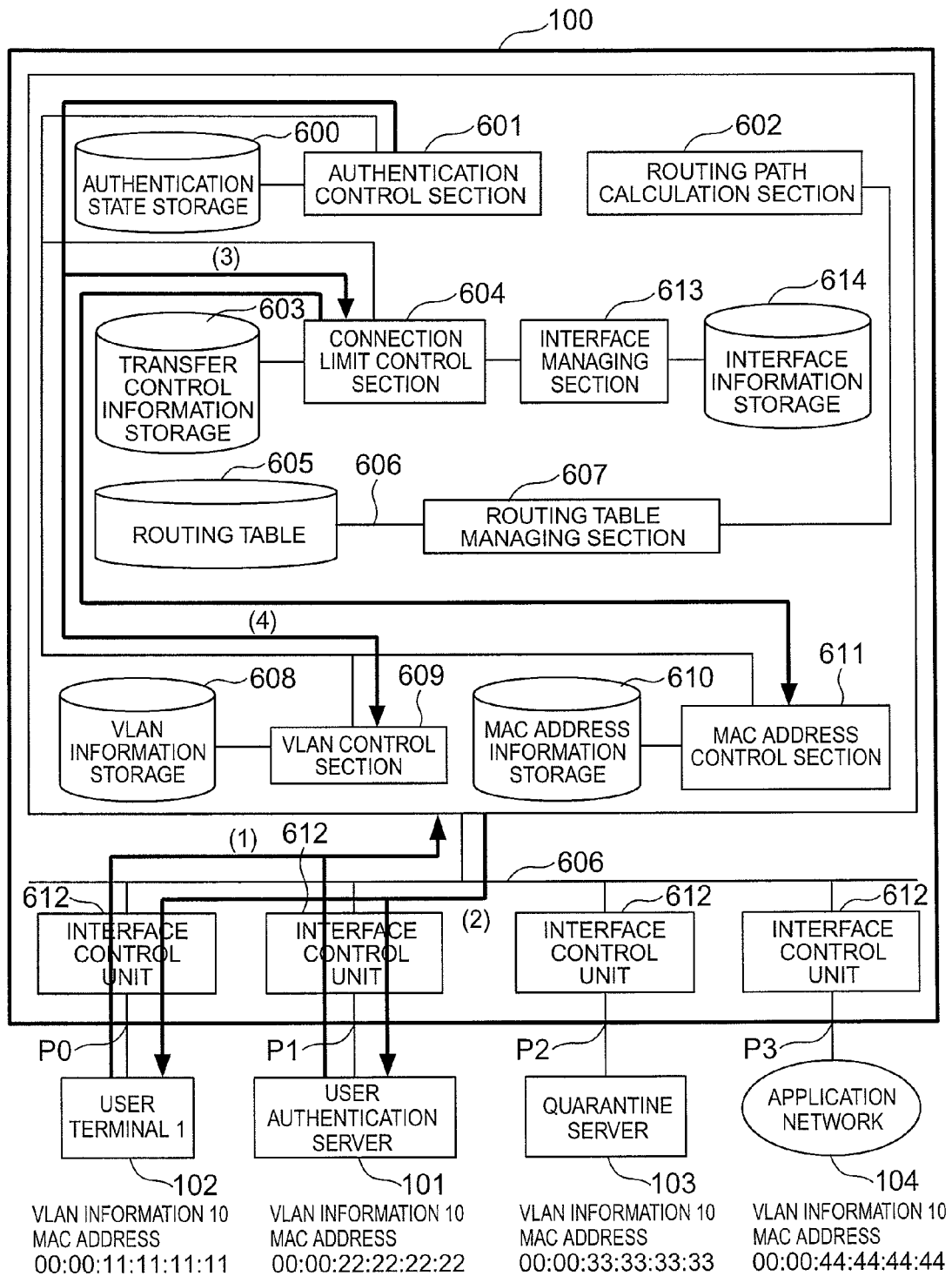
FIG. 6 is a diagram showing an internal configuration of the packet communication apparatus 100 shown in FIG. 1.

FIG. 6 shows a detailed configuration of the packet communication apparatus 100 to relay authentication between the user terminal 102 and the user authentication server 101.

An interface control unit 612 is an interface control section which houses physical communication lines such as Ethernet (registered trademark) and Packet over Sonet (POS) to control the physical layer of the International Organization for Standardization (ISO)-Open Systems Interconnection (OSI) reference model. Each interface control unit 612 is assigned with identifier information (P0 to P3 in FIG. 6) to uniquely identify the unit. In FIG. 6, the identifier information items P0 to P3 of the interface control units 612 are commonly used for those of the communication lines (ports) connected to the units 612. Viewed from the side of the packet communication apparatus 100, P0 to P3 are recognized as the identifier information items of the interface control units 612. Viewed from the side of the units such as the user terminal 102 connected to the packet communication apparatus 100, P0 to P3 are recognized as the identifier information items of ports connecting the units to the packet communication apparatus 100, specifically, the interface control units 612. It is naturally possible to discriminate the identifier information items of the interface control units 612 from those of the identifier information items of the ports connected to the respective interface control units 612.

A VLAN control section 609 executes registration, deletion, modification, and retrieval of information stored in a VLAN information storage 608. The storage 608 stores therein VLAN information set to the packet communication apparatus 100, information regarding the interface control units 612 belonging to associated VLAN, and authentication information (communicability information) determined by the authentication control section 601.

An interface control section 613 executes registration, deletion, modification, and retrieval of information stored in an interface information storage 614 and receives requests from other control sections. The storage 614 stores information items regarding the interface control units 612 coupled with the user terminal 102 and the servers such as the user authentication server 101 and the quarantine server 103.

An MAC address control section 611 executes registration, deletion, modification, and retrieval of information stored in an MAC address information storage 610 and receives requests from other control sections. The storage 610 stores a transmission source MAC address of a relay packet received by the interface control unit 612 and information regarding the unit 612 (FIG. 7).

Figures 11, 12:
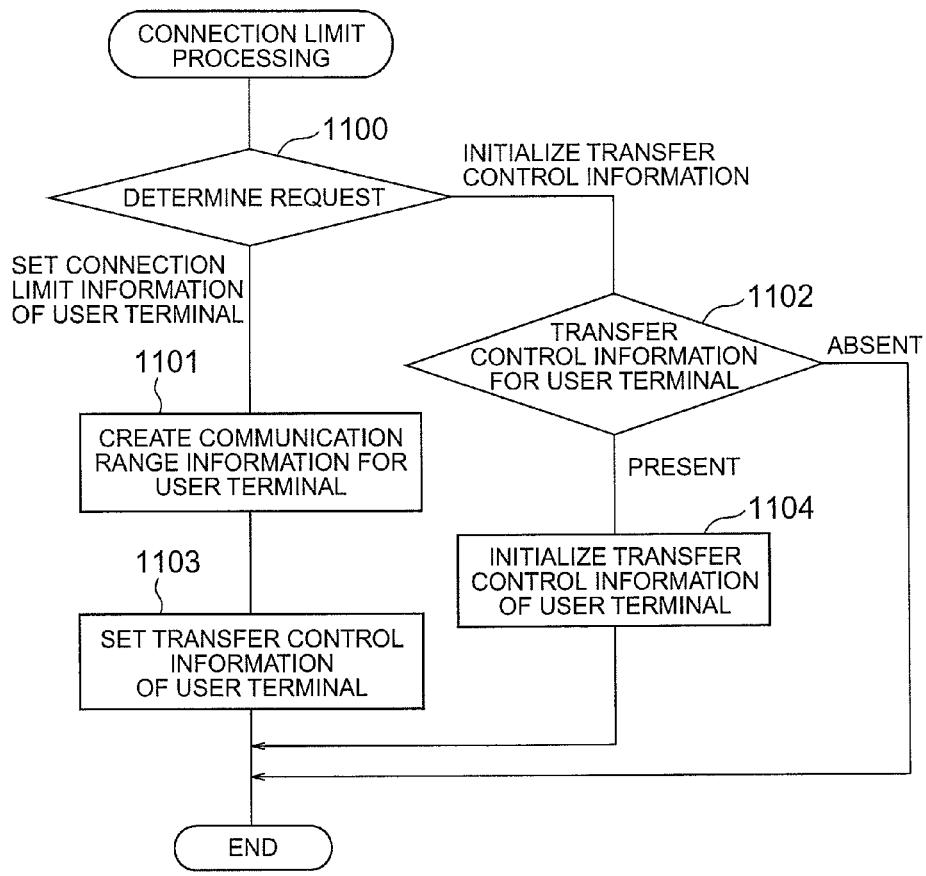
FIG. 11 is a flowchart showing details of step 804 (connection limit processing) shown in FIG. 8.
FIG. 12 is a diagram showing an example of the connection limit information stored in a transfer control information storage 603.

A connection limit control section 604 executes, according to connection limit information and connection indications received from the authentication control section 601, registration, deletion, modification, and retrieval of information stored in the transfer control information storage 603. The storage 603 stores, for example, connection limit information received by the control section 604 (FIG. 12).

An authentication control section 601 extracts authentication information from the authentication request packet received by the interface control unit 612 and executes authentication processing in cooperation with the user terminal 102 (and the user authentication server 101). The control section 601 registers a state of the user terminal 102 during the authentication to an authentication state storage 600 and issues predetermined indications to the VLAN control section 609 and the connection limit control section 604 according to the result of authentication. The storage 600 stores therein a state of the user terminal 102 during the authentication processing executed by the authentication control section 601.

A routing path calculation section 602 calculates a routing path between networks according to a routing protocol to produce a routing table 605 determining an interface control unit 612 as the transmission destination. A routing table managing section 607 conducts registration and deletion for the routing table 605 in response to indications from the calculation section 602. The routing table 605 stores routing tables created by the routing table managing section 607.

FIG. 7 shows a format of data (data table) stored in the MAC address information storage 610 of FIG. 6. Each entry of the data table stored in the storage 610 includes an address field 700 indicating an MAC address, a VLAN field 701 to indicate VLAN information (VLAN identifier information), and a transmission port filed 702 indicating identifier information of the interface control unit 612. Each entry of the table shown in FIG. 7 is used when a packet received from the interface control unit 612 is relayed. Specifically, if the VLAN information of the received packet matches that registered to the VLAN field and the destination address of the packet matches the MAC address registered to the address field 700, the packet is transmitted from the interface control unit 612 indicated by the transmission port field 702 of the entry.

Figure 8:
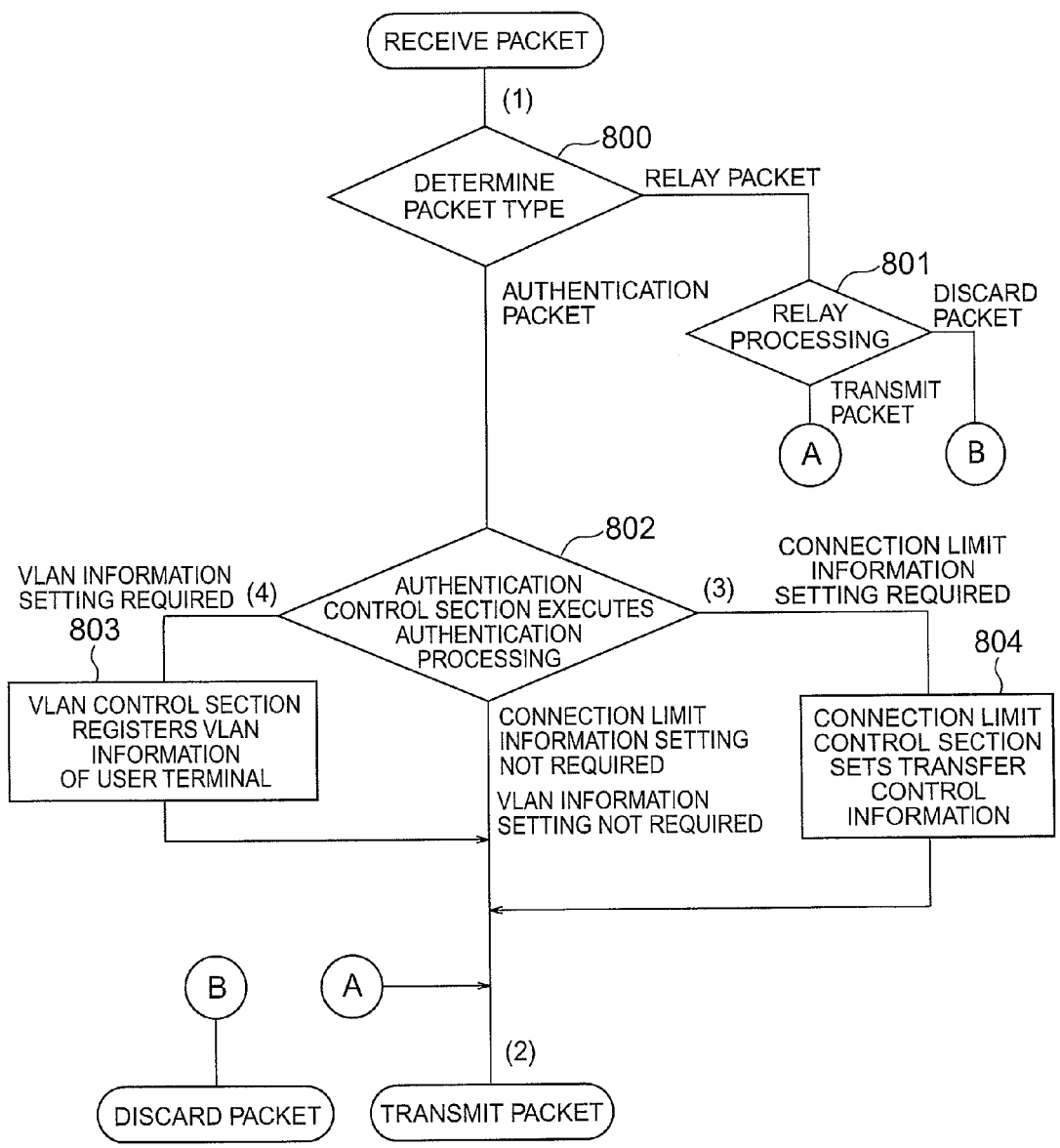
FIG. 8 is a flowchart showing an outline of packet relay processing in the packet communication apparatus 100.

FIG. 8 shows a processing flow from when the packet communication apparatus 100 receives from the user terminal 102 a packet addressed to the application network 104 to when the apparatus 100 relays or discards the packet. When the packet addressed to the application network 104 (bold line (1) of FIG. 6) is received from the user terminal 102, the interface control unit 612 determines the type of the packet (step 800). If the type is "relay packet", the control unit 612 executes relay processing (step 801). Details of the relay processing (packet transmission processing) in step 801 will be described later in conjunction with FIG. 9.

As a result of the determination in step 800, if the packet type is an authentication packet (transmitted in step 205 of FIG. 2) of a RADIUS message from the user authentication server 101 or an authentication request from the user terminal 102 (step 201 of FIG. 2), the interface control section 612 sends the packet to the authentication control section 601. The control section 601 then executes authentication processing (step 802). Details of the processing of step 802 will be described later in conjunction with FIG. 10.

As a result of the authentication in step 802, if it is determined that the connection limit is to be set to the authentication request, the authentication control section 601 sends connection limit information to the connection limit control section 604 (bold line (3) of FIG. 6) to set transfer control information (processing 804). Details of the processing in step 804 will be described later in conjunction with FIG. 11.

If it is determined that the VLAN information is required to be set for the user terminal 102, the authentication control section 601 sends the VLAN information to the VLAN control section 609 ((4) in FIG. 6). The VLAN control section 609 then registers the VLAN information to the VLAN information storage 608 (processing 803). If it is determined in step 802 that neither the connection limit information nor the VLAN information is required to be set to the authentication request, the authentication control section 601 transmits the packet to the designated interface control unit 612. Even after the VLAN information is set in step 803 and the transfer control information is then set in step 804, the packet communication apparatus 100 also sends the packet to the designated interface control unit 612 ((2) of FIG. 6).

If it is determined in step 801 (packet relay processing) that the packet is a transmission packet to be transmitted, the interface control unit 612 sends the packet to a designated second interface control unit 612. If it is determined that the packet is to be discarded, the interface control unit 612 discards the packet.

Figure 9:
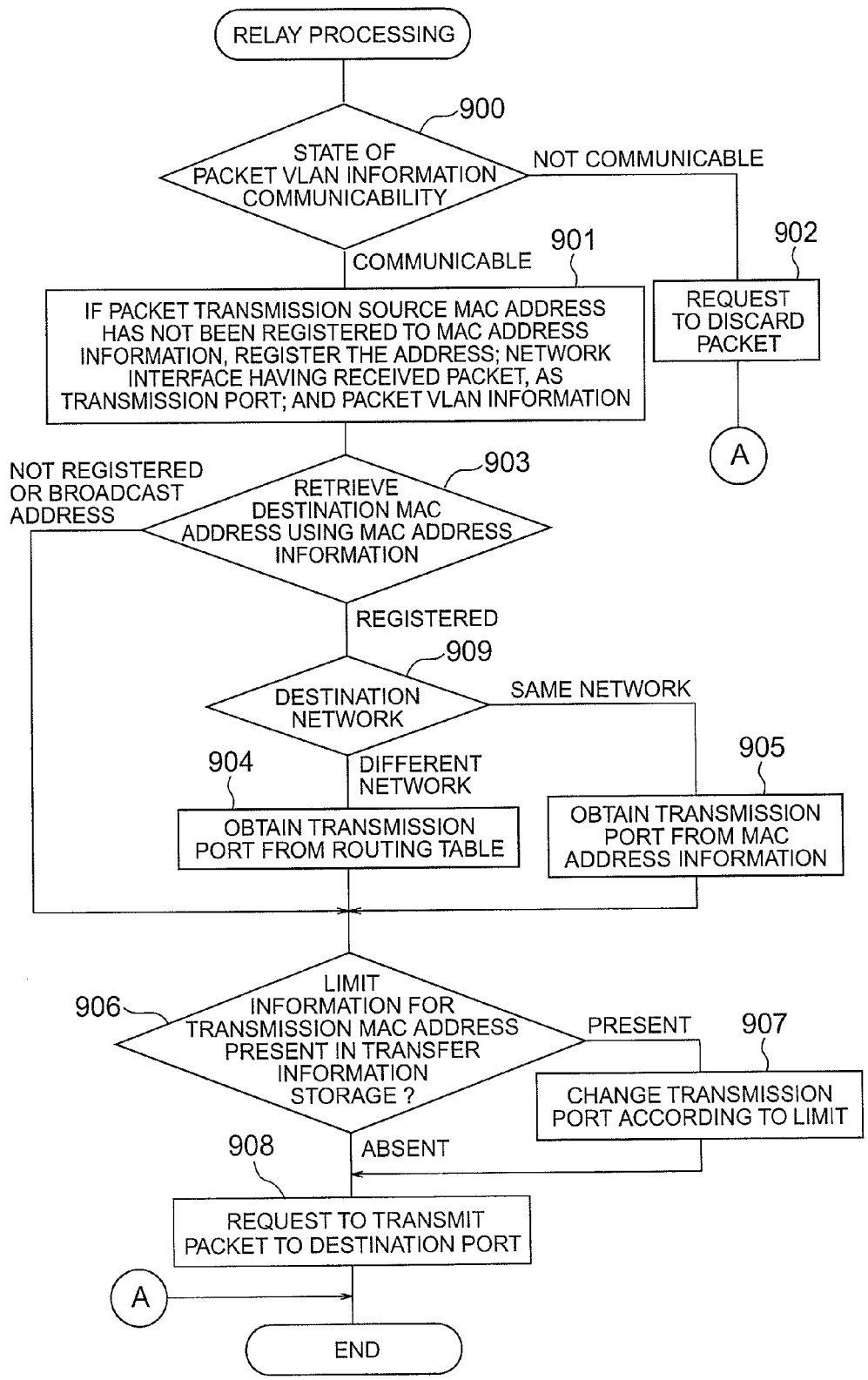
FIG. 9 is a flowchart showing details of step 801 (packet relay processing) of FIG. 8.

FIG. 9 shows a flow of layer 2 and layer 3 relay processing in the packet relay processing (step 801 of FIG. 8). The interface control unit 612 of the apparatus 100 receives from the user terminal 102 connected thereto a relay packet addressed to a second terminal coupled with the application network 104, the second terminal having MAC address of "00:00:44:44:44:44" and VLAN information of "10" in the embodiment. The VLAN control section 609 of the apparatus 100 then searches for the state of connectibility of VLAN information of the packet (the VLAN information "10" of the user terminal 102; step 900). If the state is "not connectible", the control unit 612 indicates a request to discard the packet (step 902). If the state is "connectible" in step 900, the control unit 612 sends to the MAC address control section 611 information of all interface units 612 to which the VLAN associated with the user terminal 102 belongs.

The MAC address control section 611 makes a check to determine whether or not the transmission source MAC address (e.g., MAC address of "00:00:11:11:11:11" of the user terminal 102 in FIG. 6) and the VLAN information (VLAN "10" to which the user terminal 102 belongs in FIG. 6) contained in the relay packet of the user terminal 102 received from the control unit 612 have been registered to the data table of the MAC address information storage 610. If the items have not been registered, the address control section 611 registers MAC address of "00:00:11:11:11:11" and VLAN "10" as new entry items of a table in the storage 610. Specifically, the MAC address and the VLAN are respectively registered to address and VLAN fields 700 and 701 of the table shown in FIG. 7 (step 901). The address control section 611 also registers identifier information of the interface control unit 612 having received the packet (identifier information "P0" of the interface control unit 612 coupled with the user terminal 102 in FIG. 6; the identifier information is also that of the port connected to the user terminal 102) to the transmission port field 702 of the table in the MAC address information storage 610 (step 901). That is, in this example, the item of entry #1 is registered to the table as shown in FIG. 7.

The MAC address control section 611 then searches the MAC address information storage 610 (FIG. 7) for the address field 700 to determine whether or not the terminal MAC address (e.g., "00:00:44:44:44:44") as the destination address of the packet received by the interface control unit 612 has been registered to the address field 700 (step 903). If it is determined as a result that the MAC address has been registered, the address control section 611 makes a check to determine whether or not the destination network of the packet is in the same network for communication (i.e., the VLAN information of the packet destination terminal matches the VLAN information "10" corresponding to the MAC address "00:00:44:44:44:44" registered to the table of FIG. 7; step 909). If the destination network is in the same network (i.e., the VLAN information items match each other), the address control section 611 obtains, according to the contents of the transmission port field 702 corresponding to the MAC address "00:00:44:44:44:44" registered to the MAC address information storage 610, transmission port information (P3 in the example of FIG. 7) of the interface control unit 612 for the transmission of the packet (processing 905).

On the other hand, if it is determined as a result of the processing in step 903 that the terminal MAC address as the destination address of the packet has been registered to the storage 610, but the destination network of the packet is in a different network (i.e., the VLAN information of the destination terminal of the received packet differ from the VLAN information corresponding to the MAC address of the destination terminal in the MAC address information storage 610), it is required to determine an interface control unit 612 as the transmission destination on layer 2 or higher layer. The packet communication apparatus 100 accesses the routing table 605 to obtain therefrom information of the interface control unit 612 for the transmission of the packet (transmission port information assigned to the unit 612; step 904).

In the operation of step 903, if the terminal MAC address has not been registered to the storage 610 or the destination address of the packet is indicated by the broadcast operation, the communication apparatus 100 sets as the transmission destination of the packet, all interface control units 612 to which the VLAN associated with the user terminal 102.

After the packet destination unit 612 is determined through step 903, step 904, or 905, the connection limit control section 604 searches the transfer control (limit) information storage 603 to determine whether or not the storage 603 contains transfer limit information of packets for the user terminal 102 (step 906). If the transfer limit information is present, the control section 604 changes, according to the limit information, the interface control unit 612 as the packet destination (step 907). Details of the processing in step 907 will also be described later in conjunction with FIG. 11. On the other hand, if the transfer control information is absent from the storage 603, the control section 604 sends the packet to the interface control unit 612 determined as the transmission destination in step 903, step 904, or 905 (or the transmission destination port connected to the unit 612; step 908).

Description will now be given of the packet relay processing 801 (FIG. 8) when the authentication control section 601 conducts the authentication control operation. In conjunction with the description of the ordinary relay processing flow in layer 2 and layer 3 shown in FIG. 9, if the section 601 conducts the authentication control operation, the result of the determination varies for the state of communicability of the VLAN information according to the result of authentication (step 900). If the result is "success", the result of determination for the communicability is "communicable". If the result is "failure", the result of determination for the communicability is "not communicable". For "communicable", the relay processing flow is similar to that of the ordinary layer 2 and layer 3 relay processing in step 901 and steps 903 to 909 shown in FIG. 9. For "not communicable", the authentication control section 601 indicates a request to discard the packet (step 902). The packet from the terminal for which the authentication has resulted in failure is discarded and the processing is terminated.

Figure 10:
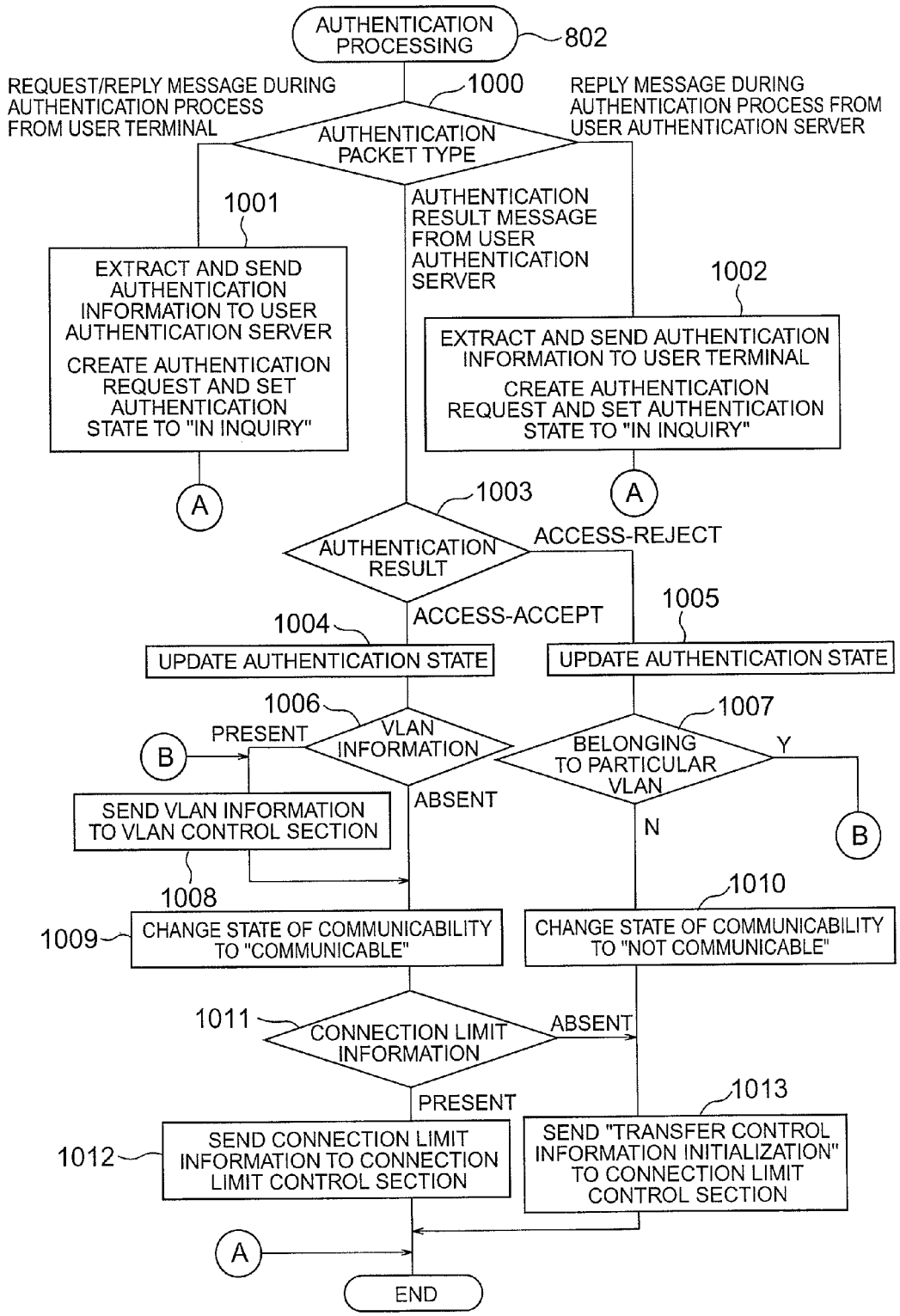
FIG. 10 is a flowchart showing details of step 802 (authentication processing) shown in FIG. 8.

FIG. 10 shows a detailed processing flow of the packet authentication processing (step 802 of FIG. 8). As described in conjunction with FIG. 8, if it is determined in step 800 of FIG. 8 that the packet type is "authentication packet", the authentication processing is executed in step 802. That the type is "authentication packet" indicates that the packet sent from the user authentication server 101 and received by the interface control unit 162 is a packet including a RADIUS message containing an authentication result (e.g., "Access-Accept") of the user terminal 102 having issued the authentication request, VLAN information (e.g., "10" as the VLAN information of the terminal 102) as an attribute item of the RADIUS message included in the packet, and connection limit information (e.g., information indicating "connectible only to the quarantine server 103") regarding the terminal 102. The interface control unit 612 transmits the authentication packet to the authentication control section 601.

First, the control section 601 determines the type of the authentication packet (authentication message; step 1000). As described above, in the example of the embodiment, the type of the authentication message is determined as a result of the authentication by the user authentication server 101. That is, the control section 601 determines the authentication result (step 1003). If the authentication message is an authentication request from the user terminal 102 or a RADIUS message created during the authentication process, the authentication control section 601 extracts therefrom authentication information, designates as the packet transmission destination the interface control unit 612 connected to the destination user authentication server 101, sets the authentication state to "inquiry having been issued to user authentication server 101", and stores the authentication state in the authentication state storage 600 (processing 1001) to thereby terminate the processing. If the received authentication message is other than the authentication result, but is a RADIUS message created during the authentication process from the user authentication server, the authentication control section 601 extracts authentication information from the message, designates as the packet transmission destination the interface control unit 612 connected to the destination user terminal 102, sets the authentication state 600 to "inquiry having been issued to user terminal", and stores the authentication state in the storage 600 (processing 1002) to thereby terminate the processing.

In step 1000, if the type of the authentication message is determined as "authentication result", the authentication control section 601 makes a check to determine the authentication result (step 1003). If the authentication result for the user terminal 102 is "Access-Accept", the control section 601 sets the authentication state (corresponding to the user terminal 102) to "success in authentication" to register or to update the authentication state in the authentication state storage 600

(step 1004). The authentication control section 601 makes a check to determine whether or not the authentication message includes VLAN information (step 1005). As above, in the example of the embodiment, the authentication message includes the VLAN information. The control section 601 sends, to the VLAN control section 609, VLAN information "10" to make the user terminal 102 belong thereto (step 1008) and sends to the VLAN control section 609 an indication to set the state of communicability of the VLAN to "communicable" (step 1009). Even if the message does not include VLAN information, the authentication result is still "Access-Accept". Therefore, the control section 601 sends in step 1009 an indication to the VLAN control section 609 to set the state of communicability of the user terminal 102 to "communicable". In response to the indication, the VLAN control section 609 sets the state of communicability of the VLAN to "communicable" sets or updates the state of communicability of the user terminal 102 to "communicable" in the VLAN information storage 608.

Next, the authentication control section 601 determines whether or not the authentication message includes connection limit information (step 1011). In the example of the embodiment described above, the message includes the connection limit information "connectible only to the quarantine server 103". The control section 601 transmits the information to the connection limit control section 604 (step 1012). If the connection limit information is not included, the control section 601 sends an indication to the connection limit control section 604 to initialize connection limit information (step 1013). The limit control section 604 stores in the connection control information storage 603 information to initialize the connection limit information.

On the other hand, if the authentication result of the user terminal 102 is "Access-Reject" as a result of the determination of the authentication result in step 1003, the authentication control section 601 registers or updates the authentication state of the terminal 102 to "authentication failure" in the authentication state storage 600 (step 1005). A check is made to determine whether or not "setting to make the user terminal for which the authentication has failed belong to a particular VLAN" has been conducted in the packet communication apparatus 100 (step 1007). If the setting has been conducted (yes in step 1007), the authentication control section 601 sends to the VLAN control section 609 particular VLAN information beforehand set (step 1008) and then executes subsequent processing. If the setting has not been conducted, that is, if "setting to disable communication of the user terminal for which the authentication has failed" has been conducted (no in step 1007), the authentication control section 601 sends an indication to the VLAN control section 609 to set the state of communicability of the VLAN associated with the user terminal 102 to "not communicable" (processing 1010). The VLAN control section 609 sets the state of communicability of the VLAN associated with the user terminal 102 to "not communicable" and stores the state in the VLAN information storage 608. The transfer control information of the user terminal for which the authentication has failed is not required or is of no use. Therefore, the authentication control section 601 sends an indication to the connection limit control section 604 to initialize control information (connection limit information) which is stored in the transfer control information storage 603 and which is the transfer control information of the user terminal having failed in the authentication (processing 1013). The control section 604 then initializes the transfer control information which is stored in the storage 603 and which is the transfer control information corresponding to the user terminal.

FIG. 11 shows a detailed flow of the connection limit processing in step 804 of FIG. 8. As described in conjunction with FIG. 8, the authentication processing is executed for the authentication packet in step 802 of FIG. 8. If the interface control unit 612 receives from the user authentication server 101 a RADIUS message including an authentication result (Access-Accept) of the user terminal (e.g., MAC address "00:00:11:11:11:11" in the example of FIG. 6) infected with a virus (or has not been quarantined), VLAN information (e.g., the VLAN information "10" of the user terminal 102) as an attribute of the RADIUS message contained in the packet, and connection limit information of the user terminal 102 (e.g., limit information indicating that the terminal 102 is connected only to the quarantine server (e.g., MAC address "00:00:33:33:33:33" and VLAN information "10" in the example of FIG. 6), the authentication control section 601 transmits the connection limit information to the connection limit control section 604.

The control section 604 receives and checks the request of the connection limit information from the authentication control section 601 (step 1100). If the request is "transfer control information initialization" (step 1013 of FIG. 10), the control section 604 accesses the transfer control information storage 603 to search for transfer control information regarding the pertinent user terminal 102 (step 1102). If the transfer control information is present, the control section 604 initializes the information (step 1104). If the transfer control information is absent, the control section 604 terminates the connection limit processing. As a result of step 1100, if the request is "setting of connection limit information" (step 1012 of FIG. 10), the control section 604 creates, according to the connection limit information, information of a communicable range for the terminal 102 (step 1101) and sets the transfer control information of the terminal 102 in the transfer control information storage 603 (step 1103).

Description will now be given of "connection limit information to connect only to quarantine server 103 (MAC address "00:00:33:33:33:33", VLAN information "10"). The connection limit information is information defining details of the communicable range of VLAN "10". For example, the user terminal 102 belongs to the VLAN designated by VLAN-ID "10" and hence is communicable in the range of VLAN "10". According to the connection limit information, even within the range of VLAN "10", the terminal 102 is communicable only with the quarantine server 103 (communication with devices other than the server 103 is restricted). Therefore, the packet communication apparatus 100 sends the received packet to the quarantine server 103.

Description will now be given of operation in which, for example, port information assigned to the interface control unit 612 is employed as the connection limit information. Since the request judgment (step 1100) results in "setting of connection limit information", the connection limit control section 604 creates communication range information for the user terminal 102 under consideration (step 1101). The communication range information in the operation using the port information indicates a range of communicable port information items selected from a plurality of port information items created on the basis of port information items for the connection of the terminal 102.

It is assumed for easy description that the ports created on the basis of port P0 for the connection of the user terminal 102 are represented as P0-0, P0-1, P0-2, and so on. For example, port information created on the basis of port P0 for the connection of the terminal 102 is represented as P0-0 and port information created on the basis of port P2 for the connection of the quarantine server 103 is represented as P2-0. Based on "connection limit information to connect only to quarantine server 103", information in the communicable range of P0-0 is associated with only port P2-0 coupled with the quarantine server 103. In this regard, when creating port information according to the port for the connection as above, a plurality of port information items may be set to one port. Also, in place of port information within a communicable range, there may be used port information within a non-communicable range. It is also possible to designate a plurality of connection ranges as the connection limit information.

FIG. 12 shows an example of the connection limit information (information stored in a transfer control information storage 603) created using port information in step 1103. Each entry of the connection limit information includes a VLAN field 1600 to store VLAN information (VLAN-ID), an address field 1601 to store an MAC address of a device or a network coupled with the interface control unit 612, a connection port field 1602 to store identifier information of the interface control unit 612 connected to the packet transmission source device (terminal), a field of port information in connection port 1603 to store port information created according to connection port information stored in the connection port field 1602, a field of port information in connectible connection port 1604 to store information of the port information 1603 granted for communication with the packet transmission source device (terminal), and a transmission port field 1605 to store identifier information of the interface control unit 612 as the packet destination.

For each entry of the transfer control information shown in FIG. 12, if it is determined in the operation to relay the packet received from the interface control unit 612 that VLAN information of the packet matches that registered to the VLAN filed 1600 and the transfer source address of the packet matches that registered to the address field 1601, the interface control unit 612 (or the transmission port corresponding to the unit 612) determined as the transmission destination in step 903, 904, or 905 of FIG. 9 is compared with the item in the transmission port field 1605 of FIG. 12. By deleting any transmission port (or the interface control unit 612) other than the transmission port registered to the field 1605, the system changes the transmission port as the packet destination (step 907 of FIG. 9).

If the connection limit information does not exist for the user terminal 102 having issued the network connection request, the packet communication apparatus 100 controls to couple the user terminal 102 to the network (the application network 104). Even in the case in which the connection limit information exists for the terminal 102, if the terminal 102 is connected to the quarantine server according to the connection limit information as above and the terminal 102 is normally quarantined, the packet communication apparatus 100 similarly controls to couple the user terminal 102 to the network (the application network 104). As a result, the user terminal 102 can be connected to the network.

Also, even in the case in which the connection limit information exists for the terminal 102, if the terminal 102 is connected to the quarantine server 103 according to the connection limit information as above and the terminal 102 is normally quarantined, the system initializes the connection limit information (stored in the transfer control information storage 603) which is possessed by the packet communication apparatus 100 and which corresponds to the user terminal 102. Resultantly, even if a network connection request is received thereafter from the user terminal 102, since the user terminal 102 has been quarantined, the packet communication apparatus 100 can relay the packet according to the request from the user terminal 102 without conducting any connection limiting operation.

Description will now be given of another example of the configuration of the embodiment.

There is provided a packet communication apparatus including a plurality of interface control units for communicating packets, MAC address information to which transmission source MAC addresses of packets receive by the interface control units are registered and which includes information identifying an interface control unit for transmission, VLAN information including VLAN-Tag information identifying a VLAN to which a packet belongs, transfer control information including control information to transfer a packet, and a routing path calculation section for calculating a routing table to determine a routing path when an interface control unit cannot be identified by the address information. The packet communication apparatus relays a packet to one interface control unit selected from the plural interface control units, using the transfer control information and the routing table which keeps therein the routine information calculated as above and which contains information identifying an interface control unit for transmission to conduct a relay operation between networks.

The packet communication apparatus is a packet communication apparatus on a network system in which a packet is communicated between a user terminal disposed via a network and a user terminal connected to an application network and a quarantine server to conduct quarantine. The packet communication apparatus is a packet communication apparatus which extracts authentication information of the user from an authentication request from a user terminal received by an interface control unit; creates an authentication request message, and transmits the message to a user authentication server, to thereby conduct authentication processing for the user terminal. Thereafter, according to an authentication result received from the user authentication server, the apparatus issues an indication to change the state of the user terminal to either one of the connective state and the nonconnective state. The packet communication apparatus is a packet communication apparatus which makes, if the authentication result received from the user authentication server includes VLAN information and connection limit information, the user terminal belong to the VLAN according to the VLAN information and then determines the communicable range of the user terminal according to the connection limit information. When the packet received from the user terminal by the interface control unit is received, the packet communication apparatus transfers the packet only to associated devices within the communicable range.

According to the packet communication apparatus described above, the connection limit information makes it possible to set the communicable range for each user terminal. Therefore, even the communication between user terminals on one and the same network, there can be set terminals allowed for communication and terminals inhibited from communication. It is hence possible to change the communication range for the user terminal without altering the network address of the user terminal.

Second Embodiment

Next, description will be given of the second embodiment. According to the first embodiment of the packet communication apparatus 100, the information of an interface control unit coupled with the user terminal 102 is employed as the connection limit information in the communication range to which the terminal 102 belongs. In contrast therewith, according to the second embodiment, to control communication between networks for which the communication range is determined in layer 2, information regarding the communication range determined in layer 2 is employed as the connection limit information. It is assumed for convenience of description that the network for which the communication range is determined in layer 2 is a VLAN.

Figures 13, 14:
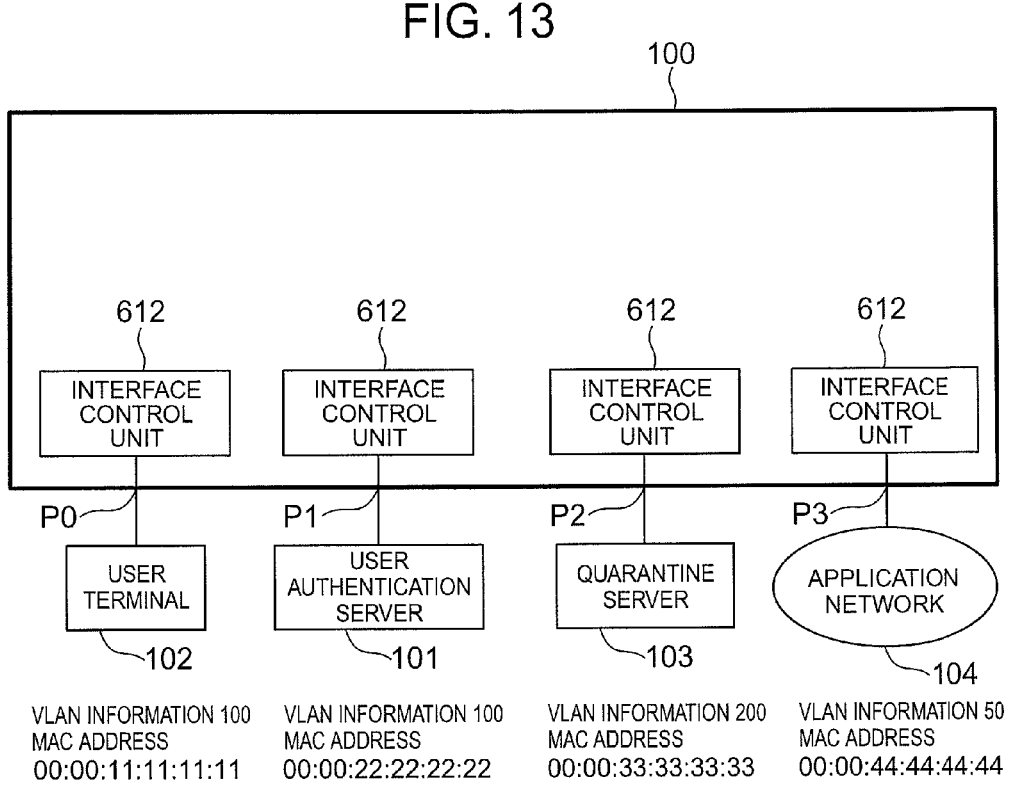
FIG. 13 is a diagram showing a configuration of a second embodiment of a network system according to the present invention.
FIG. 14 is a diagram showing another example of the connection limit information stored in a transfer control information storage 603.

FIG. 13 shows an example of a network system in the second embodiment. It is assumed that the packet communication apparatus 100 is similar in the configuration to the first embodiment. The user authentication server 101 (VLAN information 100) and the user terminal 102 (VLAN information 100) are connected to one and the same network. The quarantine server 103 (VLAN information 200) and the application network 104 (VLAN information 50) are connected to a network other than that of the user authentication server 101 and the user terminal 102.

The user terminal 102 to be quarantined sends an authentication request. The authentication is conducted for the terminal 102 through operation in which the terminal 102 conducts communication via the packet communication apparatus 100 with the user authentication server 101. If the packet sent from the user authentication server 101 and received by the interface control unit 612 contains a RADIUS message including an authentication result (e.g., "Access-Accept") of the user terminal 102, VLAN information (e.g., VLAN information "100" of the terminal 102) as an attribute of the RADIUS message contained in the packet as well as connection limit information regarding the terminal 102 (e.g., connection limit information indicating "allow to connect the terminal only to "quarantine server 103 (MAC address "00:00:33:33:33:33", VLAN information "200"), specifically, connection limit information indicating that the connectible layer 2 communication range is VLAN200, non-connectible layer 2 communication range is VLAN50), the authentication control section 601 sends the connection limit information to the connection limit control section 604.

On the basis of the connection limit information, the connection limit control section 604 creates transfer control information indicating that the connectible layer 2 communication range of the terminal 102 is VLAN200 and the non-connectible layer 2 communication range of the terminal 102 is VLAN 50 (step 1101 of FIG. 11). Although the connection limit information includes the connectible layer 2 communication range and the non-connectible layer 2 communication range, there may be employed either one thereof.

FIG. 14 shows an example of the connection limit information (stored in the transfer control information storage 603) created by the connection limit control section 604 having received the layer 2 communication range information. Each entry of the transfer control information 603 includes a VLAN field to store VLAN information (VLAN-ID), an address field 1801 to store an MAC address of a device or a network connected to the interface control unit 612, a connectible layer 2 communication range field 1802 to store a connectible layer 2 communication range included in the connection limit information sent from the interface control unit 612, a non-connectible layer 2 communication range field 1803 to store a non-connectible layer 2 communication range included in the connection limit information sent from the interface control unit 612, and a transmission port field 1804 to store transmission port information corresponding to the interface control unit 612.

For each entry of the transfer control information shown in FIG. 14, in the operation to relay the packet received from the interface control unit 612, if the VLAN information of the packet matches the VLAN information registered to the VLAN field 1800 and the transmission source address of the packet matches the address registered to the address field 1801, the destination interface control unit 612 (or the transmission port corresponding to the unit 612) determined in step 903, 904, or 905 of FIG. 9 is compared with the item of the transmission port field 1804 of FIG. 14. By deleting information of any transmission port (or any interface control unit 612) other than the transmission port registered to the transmission port field 1804, the system changes the transmission port (step 907 of FIG. 9).

According to the packet communication apparatus described above, the communicable range can be set for each user terminal by use of the connection limit information. As a result, for the communication between mutually different networks, there can be set, for each user terminal, networks to which the terminal is connectible and networks to which the terminal is not connectible. It is therefore possible to change the communication range without altering the network address of the user terminal.

In accordance with the present invention, it is possible to prevent an unauthorized user not having been authenticated from connecting to a network. Thanks to the connection limit information included in the authentication result, the authenticated user can advantageously change the communication range without altering the network address of the terminal of the user.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A packet communication apparatus connected through a network to a user terminal and an authentication server, comprising:

an interface control unit for transmitting and receiving a packet between the user terminal and the authentication server;

an authentication control unit for determining a type of a packet transmitted from the user terminal and, when the type of the packet transmitted from the user terminal is an authentication request, for transmitting the packet to the authentication server;

the authentication control unit for determining a type of a packet transmitted from the authentication server and, when the type of the packet transmitted from the authentication server is a result of authentication, for determining whether a type in an attribute of a Remote Authentication Dial In User Service (RADIUS) message of the packet includes connection limit information regarding a communication range for the user terminal;

a storage storing therein connection limit information for the user terminal;

a connection limit control unit which, if the authentication control unit determines that a type in an attribute of the Remote Authentication Dial In User Service (RADIUS) message of the packet from the authentication server includes connection limit information regarding a communication range for the user terminal as a result of the authentication by the authentication control unit, updates the connection limit information for the user terminal with the connection limit information regarding the communication range;

a transfer control unit for determining a first interface to transmit therethrough the packet with address information included in the packet received from the user terminal; and the connection limit control unit for determining, when the first interface is determined to be not within the communication range based on the connection limit information, a second interface within the communication range, instead of the first interface, to transmit therethrough the packet with address information included in the packet received from the user terminal on the basis of the connection limit information stored in the storage; wherein the second interface control unit transmits the packet received from the user terminal through the second interface.

2. A packet communication apparatus according to claim 1, wherein the connection limit information stored in the storage is set in association with a transmission source address of the packet.

3. A packet communication apparatus according to claim 1, further comprising a VLAN control unit which, if an attribute of the RADIUS message included in the authentication packet includes network information for connection of the user terminal as a result of authentication of the authentication packet by the authentication control unit, allocates the user terminal to a network corresponding to the network information.

4. A packet communication apparatus according to claim 3, wherein if a result of authentication of the packet for the user terminal by the authentication control unit indicates acceptance of access, the VLAN control unit conducts setting to allow communication for the user terminal.

5. A packet communication apparatus according to claim 1, wherein if an attribute of the RADIUS message included in the authentication packet does not include connection limit information regarding the user terminal, the connection limit control unit initializes connection limit information regarding the user terminal, with the connection limit information having been stored in the transfer control information storage into state before setting the connection limit information.

6. A packet communication apparatus according to claim 1, wherein the connection limit information stored in the storage establishes a correspondence between a transmission source address of the packet thus received, network information to which a user terminal corresponding to the transmission source address belongs, a connection port connected to the user terminal, and information of a connection port communicable with the user terminal.

7. A packet communication apparatus according to claim 1, wherein if a packet received by the first interface control unit from the authentication server includes information indicating acceptance of access to a network requested by the user terminal, the packet communication apparatus transmits to the user terminal a message indicating acceptance of the access.

* * * * *